Figure 1:
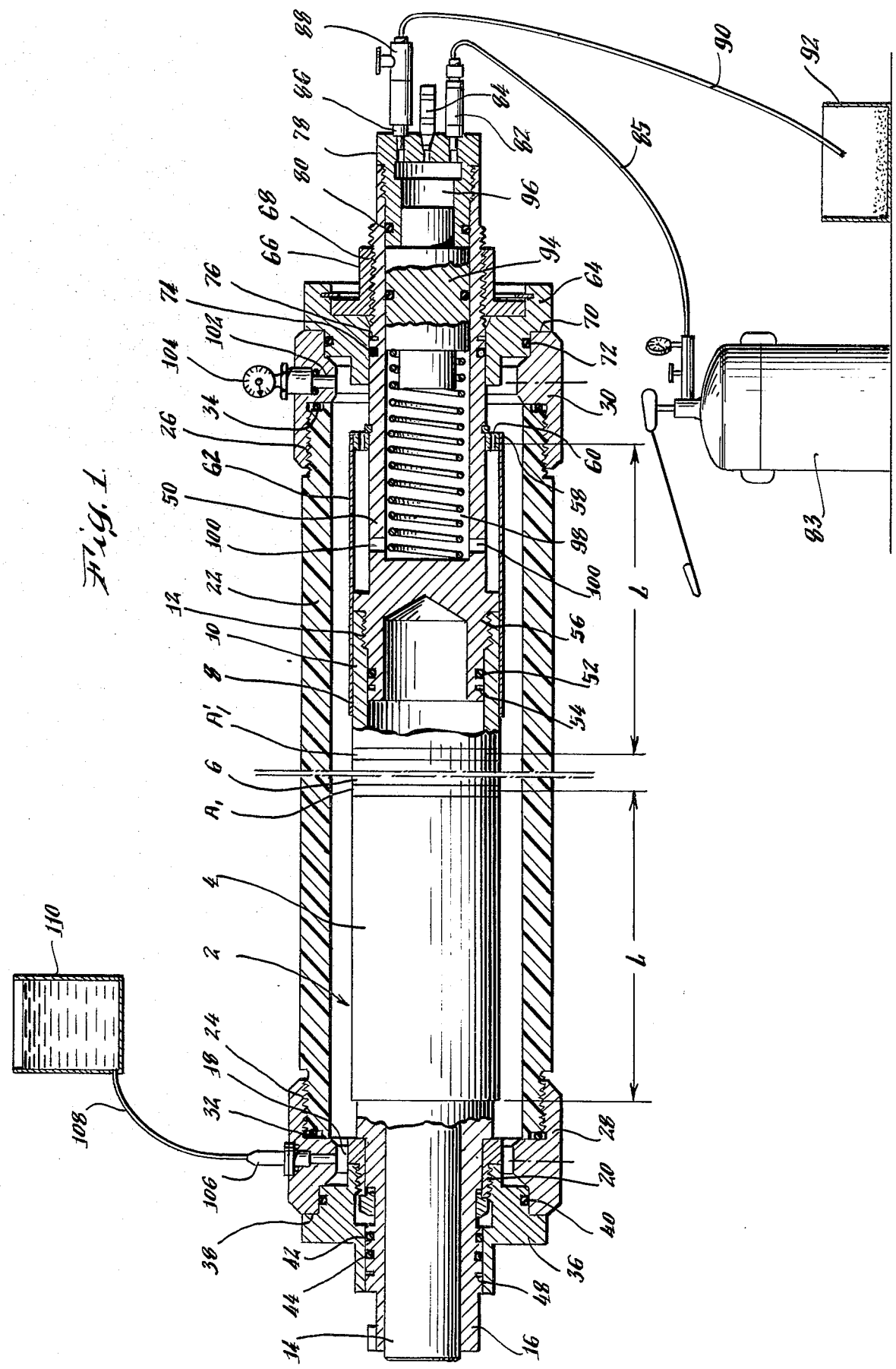

United States Patent [19]

Bonnet

[11] 4,291,267
[45] Sep. 22, 1981

[54] METHOD AND APPARATUS FOR TESTING THE INTEGRITY OF THE ELECTRICAL INSULATION OF A WELL LOGGING SONDE

[75] Inventor: Jean L. Bonnet, Chatenay Malabry, France

[73] Assignee: Schlumberger Technology Corporation, New York, N.Y.

[21] Appl. No.: 953,822

[22] Filed: Oct. 23, 1978

[30] Foreign Application Priority Data

Oct. 28, 1977 [FR] France .............................. 77 32583

[51] Int. Cl.³ ...................... G01R 31/16; G01R 31/02
[52] U.S. Cl. .................................................... 324/54
[58] Field of Search .............. 324/54, 65 R, 376, 373, 324/450; 73/4 R, 52

[56] References Cited

U.S. PATENT DOCUMENTS

| | | | |
|---|---|---|---|
| 2,978,637 | 4/1961 | Price et al. ............................ | 324/54 |
| 3,210,655 | 10/1965 | McGlasson et al. .................. | 324/54 |
| 3,292,142 | 12/1966 | Carson .............................. | 73/4 R X |
| 3,302,101 | 1/1967 | Glanville ............................. | 324/376 |
| 3,518,870 | 7/1970 | Shubert et al. ..................... | 73/4 R X |
| 3,715,925 | 2/1973 | Miller ............................... | 73/4 R X |
| 3,772,589 | 11/1973 | Scholberg ........................... | 324/373 |
| 3,775,686 | 11/1973 | Ganger et al. ....................... | 324/54 |
| 3,862,491 | 1/1975 | Richardson ....................... | 324/54 X |
| 3,958,448 | 5/1976 | Willis et al. ........................ | 73/52 X |
| 3,991,622 | 11/1976 | Oowada ............................. | 73/52 X |
| 4,107,976 | 8/1978 | Andersen et al. ..................... | 73/52 |

*Primary Examiner*—Gerard R. Strecker
*Attorney, Agent, or Firm*—Henry N. Garrana

[57] ABSTRACT

Apparatus for testing a logging sonde having a surface including elements which are electrically insulated the one from the other comprises an enclosure within which the sonde may be positioned. Conductive fluid under pressure is introduced into the enclosure so as to establish electrical conduction paths between different, spaced apart points on the surface of the sonde. Electrical communication between respective ones of the elements and the exterior of the enclosure is effected so that the sonde may be tested such as by deriving through operation of the sonde a measurement of the known resistivity of the enclosure wall.

31 Claims, 2 Drawing Figures

METHOD AND APPARATUS FOR TESTING THE INTEGRITY OF THE ELECTRICAL INSULATION OF A WELL LOGGING SONDE

The present invention relates to methods and apparatus for the analysis of subsurface formations traversed by boreholes. The invention provides a method and apparatus for testing electrical logging sondes equipped with electrodes, and more particularly of the type which effect focussing of the electric current sent into the investigated subsurface formation.

To measure the electrical resistivity of the subsurface formations traversed by a borehole, use is generally made of logging sondes equipped with electrodes lowered into the borehole by means of an electric cable. The electric measurement signals provided by the electrodes are thereafter communicated to the surface by means of this cable and are received at the surface by suitable electronic devices allowing the recording thereof.

One of the logging tools frequently used at the present time is of the type known under the name LATEROLOG (a trademark of the Schlumberger Technology Corporation). This type of tool, used for many years, is described for example in the U.S. Pat. No. 3,772,589 to A. Scholberg, et al and entitled "Apparatus For Determining The Resistivity Of A Subsurface Earth Formation At Different Lateral Distances From A Borehole Wall".

A sonde of the aforementioned type is composed mainly of a tubular metal mandrel covered by an electrically-insulating envelope on which are mounted several annular electrodes: a central electrode customarily designated $A_o$ and three pairs of electrodes $M_1$ and $M_2$, $M_1'$ and $M_2'$, $A_1$ and $A_2$ arranged symmetrically on the insulating sleeve in relation to the central electrode $A_o$. The electrodes of the same pair are connected electrically to each other by a short-circuit. The electronic circuits associated with the sonde proper and which accompany it in the borehole are grouped in a housing of tubular form which is screwed on the top end of the sonde. To make the electrical connections between the housing and the sonde, the top of the sonde has a multiple-pin electrical connector. The electrical connections of the electrodes with this connector are made inside the sonde by means of insulated electric wires. The lead-outs of the electrical connections outside the sonde are equipped with seals, generally made of rubber.

The electrical insulation of the different elements of the sonde is crucial for the proper operation of the tool, however, it is not always easy to achieve the desired insulation of the elements or to check on the condition of such insulation.

Moreover, the temperature and pressure prevailing in petroleum boreholes can reach high values. These ambient conditions favor leakage currents. In addition, drilling mud fills the well and the logging sonde must operate submersed in this mud. The electrical resistivity of the mud can be very low (a few hundredths of an ohm-meter) compared with the electrical resistivities of the investigated formations which can be high (up to 40,000 ohm-meters). Difficulty is encountered in sending the electrical measurement current into the formation due to the afore-said large difference in electrical resistivity values and the tendency of the current to pass through the drilling mud rather than the formations. Therefore, it becomes necessary to "force" the measurement current to penetrate the high-resistivity formations. By reducing any leakage current from the sonde, these leakage currents are effectively reduced through maintenance of the electrical insulation between the different components of the sonde, it being appreciated that lack of electrical insulation, though hard to detect by conventional means, can be detrimental to the operation of the logging sonde.

One method presently used for checking the proper insulation of different elements of a sonde is to dismantle the sonde, visually check the quality of the insulating materials and measure the electrical resistance between different pairs of electrodes after eliminating the conducting drilling mud. The sonde is thereafter reassembled. It may occur that, during the reassembly operation, an electrical connection wire may be pinched and that proper electrical insulation is no longer maintained. Moreover, checking of the electrical insulation with an ohmmeter on the reassembled sonde is insufficient as a test of insulation because it is carried out on a perfectly dry sonde (without drilling mud): the slightest defect in an electrical insulator, for example a hole of very small diameter, can be unnoticed on the surface in spite of a visual inspection and measurement with the ohmmeter. It can, however, be the cause of current leakage due to the high pressure prevailing in the wells since the low-resistivity drilling mud is likely to penetrate the insulator through the hole.

It is also known that a comparison of logs from a given subsurface formation carried out with different tools may make it possible to detect the poor operation of one of the tools. This verification, however, can be carried out only afterward and cannot be employed to verify the condition of the tool prior to the use of the tool.

For all these reasons, it was necessary to find a method and apparatus which provides indications of the proper operation of the sonde, even before the step of lowering it into the well to carry out the measurements.

More precisely, it is an object of the invention to provide an enclosure for testing an electrical logging sonde equipped with electrodes, characterized in that it comprises an enclosure within which the sonde may be positioned. The apparatus further includes means for establishing therein electrical conduction paths between different spaced apart points on the surface of the sonde. Means for effecting electriacl communication between respective ones of the elements and the exterior of the enclosure are provided to allow different types of tests to be applied to the sonde.

In accordance with another object of the present invention, the testing apparatus comprises a supply of fluid having an electrical resistivity which is low, relative to the electrical resistivity of air, which is introduced into the enclosure and thereafter pressurizing to assure the establishment of electrical conduction paths between different parts of the sonde.

In accordance with yet a further object of the present invention, the enclosure is provided with an attachment flange for providing a fluid tight seal between the sonde and the enclosure so that the enclosure may accommodate only a portion of the sonde. This flange may advantageously be employed to effect a simulation of sonde elements that are outside of the enclosure.

The enclosure is advantageously made up of a cylindrical tube from an electrically-insulating plastic material. The low-resistivity fluid is advantageously salt water having a resistivity of the order of 0.2 ohm-meters at ambient temperature.

Another object of the invention is to provide a method for testing a logging sonde equipped with electrodes, characterized in that the sonde is placed in a sealed enclosure with surfaces having electrical resistivity. The enclosure is thereafter filled with a fluid of low electrical resistivity and the sonde is employed to provide an indication of the resistivity of enclosure surfaces.

It has previously been proposed in the prior art (e.g., U.S. Pat. No. 3,292,142, entitled "High Pressure Transducer Calibration And Test Equipment" to D. L. Carson) to employ a pressurized chamber for the calibration and testing of a high pressure transducer. An airtight metal chamber which is cylindrically shaped is designed to accommodate the transducer to be tested. This chamber is supported within an outer chamber which may be pressurized. Electrical connections between the interior and exterior of the chambers are enabled without comprising the pressure differentials which may be maintained within the chambers during testing. When the outer chamber is properly pressurized, the transducer to be tested will operate in an environment which simulates in the laboratory the effect of a sea submerged locale. It will be appreciated that the present invention, in contrast with the disclosure of the Carson patent, provides for an electrical logging tool a testing environment which does not necessarily simulate borehole conditions. Rather the insulation between electrical interconnections of the tool are directly tested by means of submersing the tool in a conductive fluid which would readily expose insulation breakdown. Moreover to assure adequate contact between the fluid and remote portions of the tool's wiring, the conductive fluid is pressurized, therefore, in accordance with principles of the present invention, a logging tool having electrical insulation defects will be positively identified even though the defects may not be readily discernible by more conventional testing techniques or by simulation of some of the environments in which the tools is operated.

Figure 2:
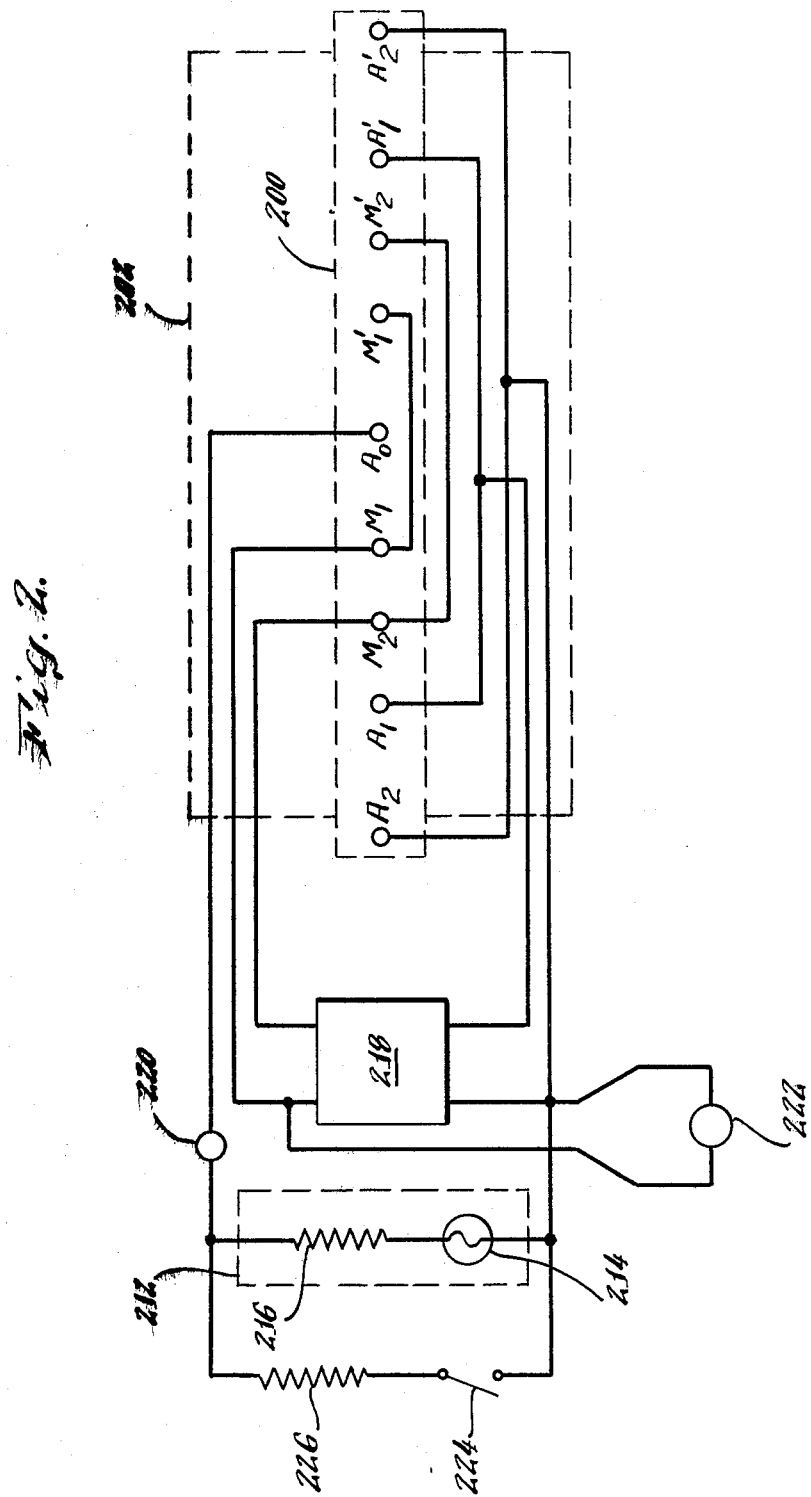

The invention will be better understood through the following description of an embodiment given as an example with reference to the appended drawings in which:

FIG. 1 represents, in longitudinal section, an embodiment of a test enclosure containing a sonde according to the invention; and FIG. 2 shows, a schematicaly representation of measurement apparatus associated with the test enclosure of FIG. 1.

In FIG. 1, a sonde 2 to be tested is shown only partially. It is of the aforementioned LATEROLOG type, but only the pair of electrodes $A_1$ and $A_1'$, called "bucking" electrodes, are shown. The pairs of electrodes $M_1$ $M_1'$ and $M_2 M_2'$, called "monitor" electrodes, as well as the current-sending electrode $A_o$ (shown in FIG. 2) are not shown in FIG. 1. These electrodes are located on the sonde between electrodes $A_1$ and $A_1'$, as will be discussed hereinafter with reference to FIG. 2. The current-return electrodes $A_2$ and $A_2'$, also not shown in FIG. 1, are each located at one of the two ends of the sonde and are generally widely spaced apart (two to three meters, for example). One of them can also be constituted by the metallic envelope of the housing of the sonde, mentioned above. The respective electrodes of a given pair are coupled together through wiring located within the housing of the sonde. These electrodes are in effect metal rings surrounding an insulating sleeve (not shown) and separated from each other by electrically-insulating spacers such as 4, 6 and 8. The sonde is terminated at one of its two ends by a metal tip 10 having the form of a hollow cylinder and equipped on the inside with a thread 12. The other end of the sonde is formed by an electrical connector 14 with several pins for the electrical connection of the electrodes to the electronic circuits of the housing (not shown). This connector is contained in a hollow metal part of approximately cylindrical form having an attachment nut 18 provided with a thread 20.

The test enclosure is formed by an electrically-insulating envelope, such as a tube 22 made of a material with a high electrical resistivity, such as plastic composed of polyvinyl chloride.

The outer surface of each of the two ends of the tube 22 is provided with threads 24, 26 on which are screwed metal tips 28, 30 respectively. Sealing between these tips and the tube is provided by means of of O-ring seals 32 and 34. An attachment flange 36 is screwed on the thread 20 of the nut 18 on the end of the sonde and comes up against a shoulder 38 of the end of the metal tip 28. Sealing between the metal tip 28 and the attachment flange 36 is provided by an O-ring seal 40 held between these two parts. Similarly, sealing between the attachment flange 36 and the end of the sonde formed by the metal part 16 is provided by O-ring seals 42 and 44. In addition, a flexible metal ring 48 is inserted between the metal part 16 forming the end of the sonde with the attachment flange 36 so as to provide good electrical contact between the end of the sonde and the flange 36.

A metal part 50 is screwed on the thread 12 of the other end of the sonde. Sealing is provided by an O-ring seal 52. Also, good electrical contact between these two parts is provided by a flexible metal ring 54.

The metal part 50 is equipped with a shoulder 56 against which comes the end of the sonde. The metal part 50 also includes a collar 58 pierced by a passage hole 60. A cylindrical sheath 62, made of an electrically-insulating material and having a diameter very slightly larger that the outer diameter of the end 10 of the sonde, surrounds this end 10 while bearing on the collar 58. The metal part 50 forms an extension for the end of the sonde. This part 50 is fixed to the metal tip 30 closing the end of the plastic tube 22 by a second attachment flange 64 equipped with a nut 66 screwed on a thread 68 located on the outer surface of the end of the metal part 50 opposite the end screwed onto the sonde. The second flange 64 comes up against a shoulder 70 of the metal tip 30. The second flange 64 is sealed from the tip 30 by means of an O-ring seal 72 located there between. Sealing between the second flange 64 and the metal part 50 is provided by an O-ring seal 74. The electrical contact between the flange 64 made of an electrically-conducting material and the metal part 50 is provided by a flexible metal ring 76 held between these two parts. The end of the metal part 50 is closed off by a plug 78 which is screwed on the end of the metal part. Sealing is provided by an O-ring seal 80. The plug 78 is equipped with three sealed passages containing a tip 82 capable of being connected to an oil pump 83 by a hose 85, a tip 84 equipped with a safety valve and a tip 86 connected to a drain valve 88 which can be connected by a hose 90 to a drain tank 92.

The metal part 50 is hollow and receives a piston 94 capable of moving inside the hollow of the metal part 50 which is divided into two chambers. One of the chambers 96 is formed by a side of the piston and the inside of the plug 78, the other chamber 98 being formed by the other end of the piston and by the inside of the metal part 50. This chamber 98 communicates with the volume defined by the inner surface of the plastic tube 22 through orifices 100 drilled in the metal part 50 and the passage 60 provided in the collar 58. The metal tip 30 contains a sealed passage 102 in which is housed the end of a pressure gauge 104. The metal tip 28 is also equipped with a filling orifice 106 adapted to be connected by a hose 108 to a tank 110 containing salt water, preferably saturated with salt at ambient temperature (however without the amount of salt being such that undissolved salt crystals remain).

In order to reduce the length of the test enclosure, the sondes of the aforementioned LATEROLOG type are tested without their current-return electrodes $A_2$–$A_2'$, due to them being widely spaced apart along the sonde.

To accomplish this, the ends of the test enclosure are provided with electrically-conducting parts. Thus, one of the current-return electrodes is simulated by the presence of the metal tip 28 and the attachment flange 36 which is connected electrically to the metal end 16 of the sonde by a flexible metal ring 48. The other current-return electrode is simulated by the presence of the metal tip 30, the attachment flange 64 and its nut 66, as well as the section of the metal part 50 not covered by the insulating sheath 62. This section is in fact defined by the collar 58 and the plug 78 closing the end of the metal part 50.

In order to comply with the symmetrical arrangement of the electrode pairs in relation to the central electrodes $A_o$, and hence so as not to introduce any unbalance from the electrical viewpoint during the testing of the sonde, the distance between the collar 58 and the bucking electrodes $A_1'$ is the same as the distance between the bucking electrode $A_1$ and the end of the insulating part 4 of the sonde. These two distances are represented in FIG. 1 by the letter L.

To introduce a sonde to be tested inside the enclosure, one begins by fixing the metal part 50 with the insulating sheath 62 at the end 10 of the sonde equipped with the thread 12. On the other end of the sonde, the attachment flange 36 is then placed on the nut 18. The sonde is then introduced inside the plastic tube 22 at the end formed by the metal tip 28, and the attachment flange 64 is placed with its nut 66. The tightening of the nut 66 makes it possible to enter the flanges 36 and 64 respectively into the tips 28 and 30 of the tube 22 and ensures the constant sealing of the sonde inside this plastic tube 22. The filling orifice 106 is then connected by a flexible tube 108 to the salt water tank 110. The tips 82 and 86 are connected respectively to the oil pump 83 and to the drain tank 92. One then begins to introduce salt water into the enclosure. In order to allow the air to escape during this filling operation, a passage (not shown in FIG. 1), which can be closed off by a sealed plug, is provided in the metal tip 30. When the enclosure is completely filled with salt water, the filling tip 106 is replaced by a sealed plug and oil is introduced into the chamber 96 by the oil pump 83 so as to pressurize the salt water contained in the enclosure. The electrical connector 14 of the sonde is then connected to the electronic measurement casing (not shown) by means of a cable. The electronic casing is itself connected to measuring instruments, and in particular to a galvanometer. The electronic casing and the measuring instruments are conventional with this type of sonde since it is they that, in connection with the sonde, make it possible to carry out measurements in the boreholes.

These measuring instruments include mainly a differencial amplifier, a current source, a voltmeter, an ammeter, a resistor of a chosen value and, finally, a switch. The arrangement of these different elements is shown in FIG. 2 and will be given in the description to follow.

A sonde of the aforementioned LATEROLOG type can operate in different ways. FIG. 2 shows a schematic representation of the electrical connections, in accordance with a possible operating mode, of such a sonde 200 enclosed in the testing enclosure 202. The electrical connections are of course provided by means of the connector 14 (FIG. 1) located at the end of the sonde. This sonde has a current-sending central electrode $A_o$ and four pairs of electrodes located symmetrically on the sonde with respect to the central electrode $A_o$. The first two pairs of electrodes $M_1$ $M_1'$ and $M_2$ $M_2'$ are monitor electrodes. The electrodes $A_1$ and $A_1'$ are bucking electrodes. The electrodes $A_2$ and $A_2'$ are current-return electrodes which are simulated, for the testing of the sonde, by the metal parts located at the ends of the plastic tube 22 as explained earlier. The respective electrodes of a given pair are, for the operating mode considered, connected electrically to each other. It is important to note that the leakage currents which are detected by means of the present invention are generated in most cases along these connections due to the insulating defects. These leakage currents may be regarded as "radial" currents because they are generally propagated perpendicularily to the axis of the electrical sonde between the central electrode $A_o$ and the current return electrodes $A_2$ and $A_2'$. The current source can, for example, be formed an alternating current generator 214 connected in series with a high impedance 216. The potential difference existing between the pairs of electrodes $M_1$ $M_1'$ and $M_2$ $M_2'$ is applied to the input of a differential amplifier 218 whose two outputs are connected respectively to the pair of electrodes $A_1$ and $A_1'$ and $A_2$ and $A_2'$. The potential difference existing between the pairs of bucking and current-return electrodes consequently depends on the potential difference between the pairs of monitor electrodes. A galvanometer 220 is placed in series with the current source 212 between the current-sending electrode $A_o$ and the pair of current-return electrodes $A_2$ and $A_2'$. A voltmeter 222 makes it possible to measure the potential difference existing between the pair of electrodes $M_1$ $M_1'$ (or possibly $M_2$ $M_2'$) and the pair of current-return electrodes $A_2$ $A_2'$. At the terminals of the current source 212 are connected in series a switch 224 and an electrical resistor 226 of a known value, for example 20,000 ohms.

The operating principle of the logging sondes of the aforementioned LATEROLOG type is described in the U.S. Pat. No. 3,772,589 mentioned above or in an article published in the "Petroleum Transactions, AIME", Volume 192, 1951, from page 305 to page 316. It is however useful to briefly review here the operating principle.

A current is sent into the formations traversed by a borehole through the current-sending electrode $A_o$. The potential difference between the pairs of electrodes $A_1$ $A_1'$ and $A_2$ $A_2'$ is adjusted automatically so that the potential difference existing between the two pairs of monitor electrodes $M_1$ $M_1'$ and $M_2$ $M_2'$ is near zero.

Consequently, no electric current flows between these two pairs of monitor electrodes. One then measures, by means of the galvanometer 220, the electric current flowing into the subsurface formations between $A_o$ and $A_2 A_2'$ and, by means of the voltmeter 222, the potential difference existing between the pair of electrodes $M_1 M_1'$ (or $M_2 M_2'$, which is equivalent) and the current-return electrodes $A_2 A_2'$. The preceding current and voltage measurements make it possible to calculate the electrical resistivity of the formations. Since no electric current flows between $M_1$ and $M_2$ or between $M_1'$ and $M_2'$, the electric current sent into the formation by the electrode $A_o$ must penetrate into the formation perpendicular to the axis of the sonde and hence practically horizontally relative to the vertical borehole axis. A focussing effect is thus obtained on the current sent into the formation. The distance of the investigated formations in relation to the borehole depends on the extent of this focussing effect. In fact, the greater this effect, the further are the investigated formations from the borehole and vice versa. This focussing effect itself depends on the relative distances and on the potential differences between the various electrodes. In practice, one thus distinguishes, as already mentioned, two operating modes for the Laterolog sonde which can moreover be carried out simultaneously.

According to the first mode, called the deep investigation mode, the potential differences between the various electrodes are practically nil owing to their distance from the current-return electrode located on the surface. The result is that the leaks between electrodes in fact result in currents of very low intensity. This deep investigation operating mode consequently does not lend itself greatly to the detection of leakage currents due to insulating defects, for example, since the operation of the tool is such that no electric current can flow between these electrodes. On the other hand, according to the second operating mode, called the shallow investigation mode and which corresponds to a smaller focussing effect on the current sent into the formation, the potential differences existing between the various electrodes are not nil because the electrodes $A_2$ and $A_2'$ are used for the return of current. An insulating defect can give rise to a large leakage current. Accordingly, the sonde is made to operate within the test enclosure in the shallow investigation mode.

The electric current sent into the formation by the central electrode $A_o$ is "forced", as it were, to penetrate into the formation, a task whose difficulty is related to the disparity in the electrical resistivity of the drilling mud relative to the electrical resistivity of the subsurface formation. The leakage currents between the various electrodes will increase as the difference in the electrical resistivities of the mud and the formation increases.

According to the present invention, the more favorable experimental conditions for the observation of leakage currents are simulated within the test enclosure. For this purpose, the envelope of the test enclosure constituted by the tube 22 is made up of a material of high electrical resistivity and the fluid filling the test enclosure is chosen for its very low electrical resistivity value. The tube 22 represents the formation whose electrical resistivity is being measured and the filling fluid (salt water) represents the drilling mud. In practice, the electrical resistivity of subsurface formations of interest in petroleum prospecting is very rarely higher than 40,000 ohm-meters. The material used for making the tube 22 can thus have an electrical resistivity equal to or higher than 40,000 ohm-meters. As regards the drilling mud, its electrical resistivity is generally not lower than a few hundredths of an ohm-meter. However, to ensure proper operation of the sonde, it is not necessary to use a fluid with a resistivity as low as a hundredth of an ohm-meter for immersing the sonde within the test enclosure. Salt-saturated water has a resistivity of about 0.2 ohm-meters at ambient temperature and is suited to the tests.

Depending on the electrode pairs considered, electric current leaks between the electrode connections will affect differently the resistivity measurements carried out with the sonde. Thus, an electric current leak between the connections of the electrodes $M_1$ and $A_1$ will result in an increase in the resistivity value measured with the sonde. The same is true when a current leak exists between the connections of the electrodes $M_2$ and $A_2$ or between $M_2'$ and $A_2'$. On the other hand, the vaue of the measured electrical resistivity decreases if a current leak exists between the connections of $A_o$ and $A_2$ or $A_2'$, or $M_1$ and $A_2$, and $M_1'$ and $A_2'$.

According to the method of the present invention, a sonde is thus tested in two stages so as to detect the leakage currents producing a decrease in the measurement and those giving rise to an increase in the measurement. One begins by first detecting the insulation defects resulting in a decrease in measurement by current operating the tool near its measurement saturation value. To accomplish this, one measures, as it were, the electrical resistivity of the envelope of the test enclosure which is large relative to the measurement saturation value, i.e. near 40,000 ohm-meters, by means of the sonde. The measured value should correspond to the known value of the resistivity of the tube 22. When use is made of the electronic housing and the measurement instruments associated with the sonde, which allow measurements only up to 40,000 ohm-meters, it should be observed that the value read is at least equal to 40,000 ohm-meters. In this case, there is a saturation of the measurement galvanometer. If a decrease in the measurement current is observed, this means that there is a current leak.

During the second stage, one detects the insulation defects giving rise to an increase in the measurement current. it is to be noted that these stages can be carried out in any order. By means of a switch 224, an electrical resistor 226 of known value is connected to the terminals of the current source 212 and is in parallel with the current source 212 between the electrode $A_o$ and the electrode pair $A_2 A_2'$. The value of the resistor 226 is chosen so that it is intermediate between 0 and 40,000 ohm-meters, for example 20,000 ohm-meters, so as to allow easy reading with the measurement galvanometer. The resistance value measured with the sonde should correspond substantially to the value of the resistor 226. If the measured value does not substantially correspond to the value of the resistor 226, it is an indication that there is a current leak and hence an insulation defect. It will be appreciated that this type of insulation defect giving rise to and increase in the measurement current, would not have been detected during the first stage of the test method when the electronic housing and the measurement instruments associated with the sonde are used because they are operated near the saturation measurement value. The two measurement stages thus make it possible to detect current leaks having given rise to an increase and to a decrease in the measurement current read by the galvonometer 220.

The present invention is obviously not limited to the embodiment described and represented by way of example. In particular, the embodiment described is particularly well suited to the testing of logging sondes of the LATEROLOG type, but it is clear that other types of logging sondes with electrodes can be tested by applying the teaching of the present invention. The numerical values indicated, for example, the resistivity values of the envelope of the enclosure, as well as the value of the resistor 226, are given only as examples. The piston 94 movable by the oil introduced under pressure into the chamber 96 represents only one embodiment of the means for pressurizing the fluid of low resistivity filling the test enclosure. Other embodiments may be considered without departing from the framework of the invention.

What is claimed is:

1. Apparatus, for testing the integrity of the electrical insulation of a logging sonde having a plurality of electrodes in order to measure the electrical resistivity of earth formations traverse by a borehole, said sonde being adapted to be lowered into said borehole, comprising:

an enclosure capable of containing a fluid introduced therein;

means connecting said sonde to said enclosure for positioning selected ones of said electrodes within said interior;

means communicating with said interior for introducing within said enclosure, between said sonde and said enclosure, a conductive fluid, said enclosure and said connecting means being so constructed and arranged that electrical conduction paths are capable of being established through said fluid and said enclosure; and means for effecting electrical communication between respective ones of said electrodes and the environment exterior of said enclosure in order to accommodate a measurement of parameters associated with the operation of said sonde within said enclosure and said fluid such as to permit the derivation therefrom of an indication of the integrity of said electrical insulation.

2. The apparatus of claim 1 wherein said introducing means comprises:

a supply of said fluid, said fluid having an electrical resistivity which is low relative to the electrical resistivity of air;

means for connecting said fluid supply with the interior of said enclosure; and means for pressurizing the interior of said enclosure after the introduction of said fluid therein, said sonde thereby being at least partly immersed in pressurized conductive fluid.

3. Apparatus for testing the integrity of the electrical insulation of a logging sonde having a plurality of electrodes in order to measure the electrical resistivity of earth formations traversed by a borehole, said sonde being adapted to be lowered into said borehole, comprising:

an enclosure capable of containing under high pressure a fluid introduced therein;

means connecting said sonde to said enclosure for positioning selected ones of said electrodes within said interior;

a supply of conductive fluid, said fluid having an electrical resistivity which is low relative to the electrical resistivity of air;

means communicating with the interior of said enclosure for introducing said fluid from said supply into said enclosure, between said sonde and said enclosure;

means for pressurizing the interior of said enclosure after the introduction of fluid therein, said sonde thereby being at least partly immersed in pressurized conductive fluid, and said enclosure and said connecting means being so constructed and arranged that electrical conduction paths are capable of being established through said fluid and said enclosure; and means for effecting electrical communication between respective ones of said electrodes and the environment exterior of said enclosure in order to accommodate a measurement of parameters associated with operation of said sonde within said enclosure and said fluid such as to permit the derivation therefrom of an indication of the integrity of said electrical insulation.

4. The apparatus of claim 1 or 3, wherein said enclosure comprises electrically insulating material.

5. The apparatus of claim 1 or 3, wherein said enclosure, having an opening through which a portion of said sonde may be admitted therein, comprises an attachment flange for providing a fluid tight seal between said sonde and said enclosure.

6. The apparatus of claim 5 wherein said electrical communication effecting means includes portions of said sonde which are exterior of the enclosure.

7. The apparatus of claim 2 or 3 wherein said pressurizing means includes:

a hollow part fixed in a sealed manner to one end of said enclosure by an attachment flange such that a section of said hollow part communicates with the interior of said enclosure, the other section communicating with the outside of said enclosure and having an orifice in a closed end thereof for the passage of a compression fluid, and a piston movably mounted inside said hollow part and delimiting a first chamber pierced with said orifice and, in combination with said enclosure, a second chamber.

8. The apparatus of claim 2 or 3 wherein said fluid is salt water.

9. A method for testing the integrity of the electrical insulation of a logging sonde having a plurality of electrodes in order to measure the electrical resistivity of earth formations traversed by a borehole, said sonde being adapted to be lowered into said borehole, comprising the steps of:

positioning said sonde in the interior of an enclosure capable of containing a fluid introduced therein, by connecting said sonde thereto such that selected ones of said electrodes are disposed within said interior;

providing a conductive fluid within said enclosure, between said sonde and said enclosure;

effecting electrical communication between respective ones of said electrodes and the environment exterior of said enclosure;

coupling selected ones of said electrodes to a source of electrical energy, electrical conduction paths thereby being established through said enclosure; and measuring the electrical energy detected by other selected ones of said electrodes such as to permit the derivation therefrom of an indication of the integrity of said electrical insulation.

10. The method of claim 9 wherein said fluid providing step comprises:
providing a supply of said fluid, said fluid having an electrical resistivity which is low relative to the electrical resistivity of air;
connecting said fluid supply with the interior of said enclosure to supply fluid thereto; and
pressurizing the interior of said enclosure after the introduction of said fluid therein, said sonde thereby being at least partly immersed in pressurized conductive fluid.

11. The method of claim 9, wherein said positioning step comprises the steps of:
placing a portion of said sonde within said enclosure; and
coupling an attachment flange between said sonde and said enclosure for providing a fluid tight seal.

12. A method for testing the integrity of the electrical insulation of a logging sonde having a plurality of electrodes in order to measure the electrical resistivity of earth formations traversed by a borehole, said sonde being adapted to be lowered into said borehole, comprising:
positioning said sonde in the interior of an enclosure capable of containing under high pressure a fluid introduced therein, by connecting said sonde thereto such that selected ones of said electrodes are disposed within said interior;
providing a supply of a conductive fluid, said fluid having an electrical resistivity which is low relative to the electrical resistivity of air;
introducing said fluid from said supply into said enclosure, between said sonde and said enclosure;
pressurizing the interior of said enclosure after the introduction of fluid therein, said sonde thereby being at least partly immersed in pressurized low resistivity fluid; and
effecting electrical communication between respective ones of said electrodes and the environment exterior of said enclosure for establishing electrical conduction paths through said fluid and said enclosure and for accommodating measurement of parameters associated with operation of said sonde within said enclosure and said fluid such as to permit the derivation therefrom of an indication of the integrity of said electrical insulation.

13. The method of claim 9 or 12 further comprising the step of operating said sonde in a manner such that the electrical resistivity of the material forming said enclosure is measured by said sonde.

14. The method of claim 12, wherein said positioning step comprises the steps of:
placing a portion of said sonde within said enclosure; and
coupling an attachment flange between said sonde and said enclosure for providing a fluid tight seal.

15. The method of claim 11 or 12, wherein said electrical communication effecting step includes the step of effecting electrical communication through portions of said sonde which are exterior of said enclosure.

16. Method for testing a logging sonde equipped with electrical insulation for the electrical elements thereof and respective current sending and current return electrodes, comprising the steps of:
placing said sonde within a sealed enclosure having a wall of known high electrical resistivity;
filling said enclosure with a fluid of low electrical resistivity capable of having electrical conduction paths established therein;
placing said fluid under high pressure;
measuring the electrical resistivity of said wall by means of said sonde operating in a shallow investigation mode, conduction paths traversing said fluid and said wall thereby being established; and
comparing the value obtained in said wall resistivity measuring step with the known electrical resistivity of said wall, leakage currents tending to produce a decrease in a measurement current obtained in said wall resistivity measuring step thereby being capable of detection.

17. The method of claim 16, wherein said filling step comprises the step of filling said enclosure with salt water.

18. The method of claim 16, wherein said enclosure is constructed of a material having an electrical resistivity at least equal to the maximum electrical resistivity value that said sonde is capable of measuring.

19. The method of claim 16, wherein said step of placing said fluid under high pressure comprises the step of pressurizing said fluid to a pressure of between ten and twenty bars.

20. The method of claim 16, further comprising the steps of:
connecting an electrical resistor of a known predetermined value that is between zero resistivity and the maximum electrical resistivity value that said sonde is capable of measuring, across said current return electrode and said current sending electrode;
measuring the electrical resistivity of said resistor by means of said sonde; and
comparing the value obtained in said resistor resistivity measuring step with the known resistivity of said resistor, leakage currents tending to produce an increase in a measurement current obtained in said resistor resistivity measuring step thereby being capable of detection.

21. The method of claim 16, wherein said current return electrode comprises a pair of electrode elements, and wherein said step of placing said sonde comprises the step of locating conductive material at respective predetermined spaced-apart locations within said enclosure to simulate respectively said electrode elements whenever said current return electrode is exterior of said enclosure.

22. An apparatus for testing the integrity of the electrical insulation of a logging sonde having a plurality of electrodes for measuring the electrical resistivity of earth formations traversed by a borehole, comprising:
an enclosure capable of containing under high pressure a conductive fluid introduced therein;
means for retaining said sonde within said enclosure to form an intervening space therebetween capable of being occupied by said conductive fluid under pressure;
means for providing a current path for current originating from and returning to said sonde, said current path traversing at least a portion of said conductive fluid and at least a portion of said enclosure;
means for highly pressurizing said conductive fluid; and means for effecting electrical communication with said electrodes from the environment exterior of said enclosure such that electrical parameters associated with operation of said sonde after pressurization of said conductive fluid are measurable, an indication of the integrity of said electrical insulation thereby being capable of determination.

23. An apparatus as in claim 22, wherein said enclosure comprises electrically insulating material.

24. An apparatus as in claim 22, wherein said retaining means comprises means for mutually engaging the respective ends of said sonde with respective portions of said enclosure such that said sonde is rigidly maintained in predetermined alignment with said enclosure.

25. An apparatus as in claim 22, wherein at least a portion of said enclosure is substantially cylindrical and said sonde is substantially a cylindrical body, and wherein said retaining means comprises means for mutually engaging the respective ends of said enclosure and said sonde such that said cylindrical enclosure portion and said sonde are maintained in coaxial alignment with one another.

26. An apparatus as in claim 25, wherein said cylindrical enclosure portion comprises electrically insulating material and said enclosure also comprises means engaging said cylindrical enclosure portion for simulating respective current return electrode elements of said sonde.

27. An apparatus as in claim 22, wherein said retaining means includes a hollow cylindrical structure communicating with said intervening space for cooperating with said pressurizing means, and wherein said pressurizing means comprises:

a piston movably disposed within said hollow cylindrical structure for delimiting a first chamber of said hollow cylindrical structure in communication with said intervening space, and a second chamber having an orifice therein; and means for providing a compression fluid through said orifice to said second chamber, said piston thereby being actuated to pressurizing said conductive fluid in said space.

28. An apparatus as in claim 22, wherein the electrical resistivity of said fluid is substantially less than the electrical resistivity of said enclosure.

29. An apparatus as in claim 28, wherein the electrical resistivity of said conductive fluid is low relative to the electrical resistivity of air.

30. An apparatus as in claim 29, wherein said conductive fluid is salt water.

31. An apparatus as in claim 22 further comprising circuit means connected to said electrical communication effecting means for determining said indication of the integrity of said electrical insulation.

* * * * *

UNITED STATES PATENT AND TRADEMARK OFFICE
CERTIFICATE OF CORRECTION

PATENT NO. : 4,291,267
DATED : Sep. 22, 1981
INVENTOR(S) : Jean L. Bonnet

It is certified that error appears in the above-identified patent and that said Letters Patent are hereby corrected as shown below:

In the Specification, column 2, line 48, "electriacl" should read --electrical--. Column 3, line 50, "shows, a schematicaly" should read --shows a schematic--. Column 4, line 21, delete "of" (first occurrance); line 44, "that" should read --then--. Column 6, line 34, "perpendicularily" should read --perpendicularly--; line 37, "an" should read --at--.

In the Claims, column 9, line 23 (Claim 1), "traverse" should read --traversed--; line 30, "said interior" should read --the interior of said enclosure--; line 68 (Claim 3), "said interior" should read --the interior of said enclosure--.

Signed and Sealed this

Thirtieth Day of March 1982

[SEAL]

Attest:

GERALD J. MOSSINGHOFF

Attesting Officer     Commissioner of Patents and Trademarks